March 20, 1945.    E. W. CHAFEE ET AL    2,371,606
BOMB SIGHT
Filed Feb. 26, 1937    6 Sheets-Sheet 1
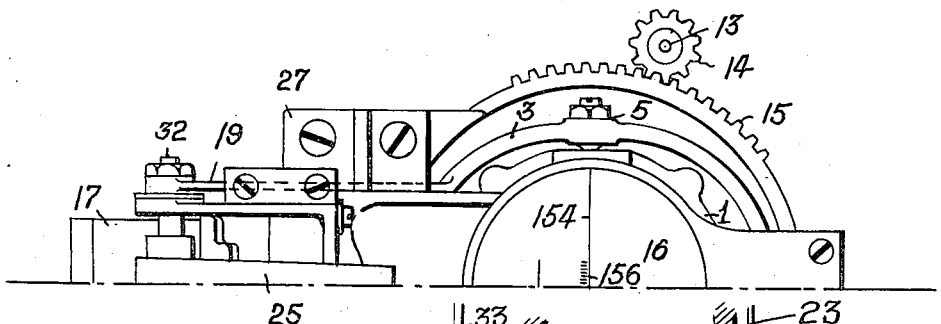
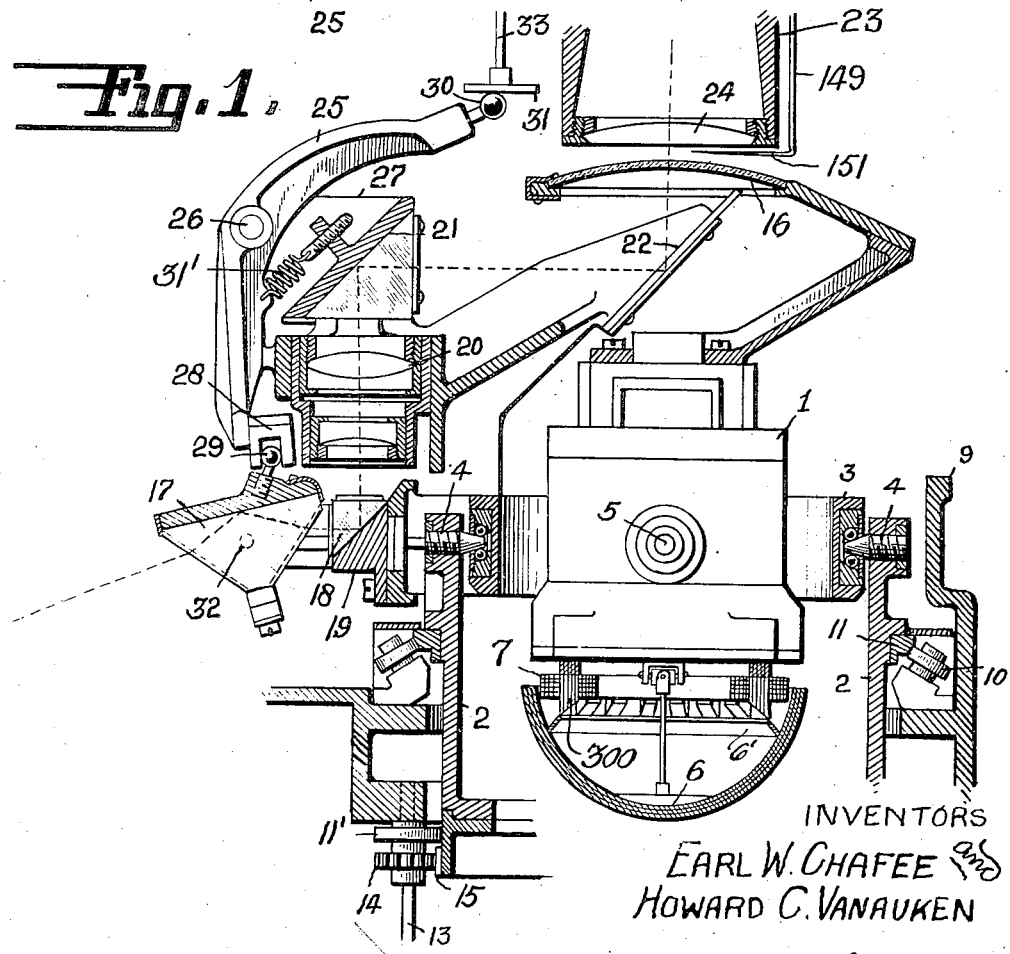

March 20, 1945.  E. W. CHAFEE ET AL  2,371,606
BOMB SIGHT
Filed Feb. 26, 1937  6 Sheets-Sheet 2
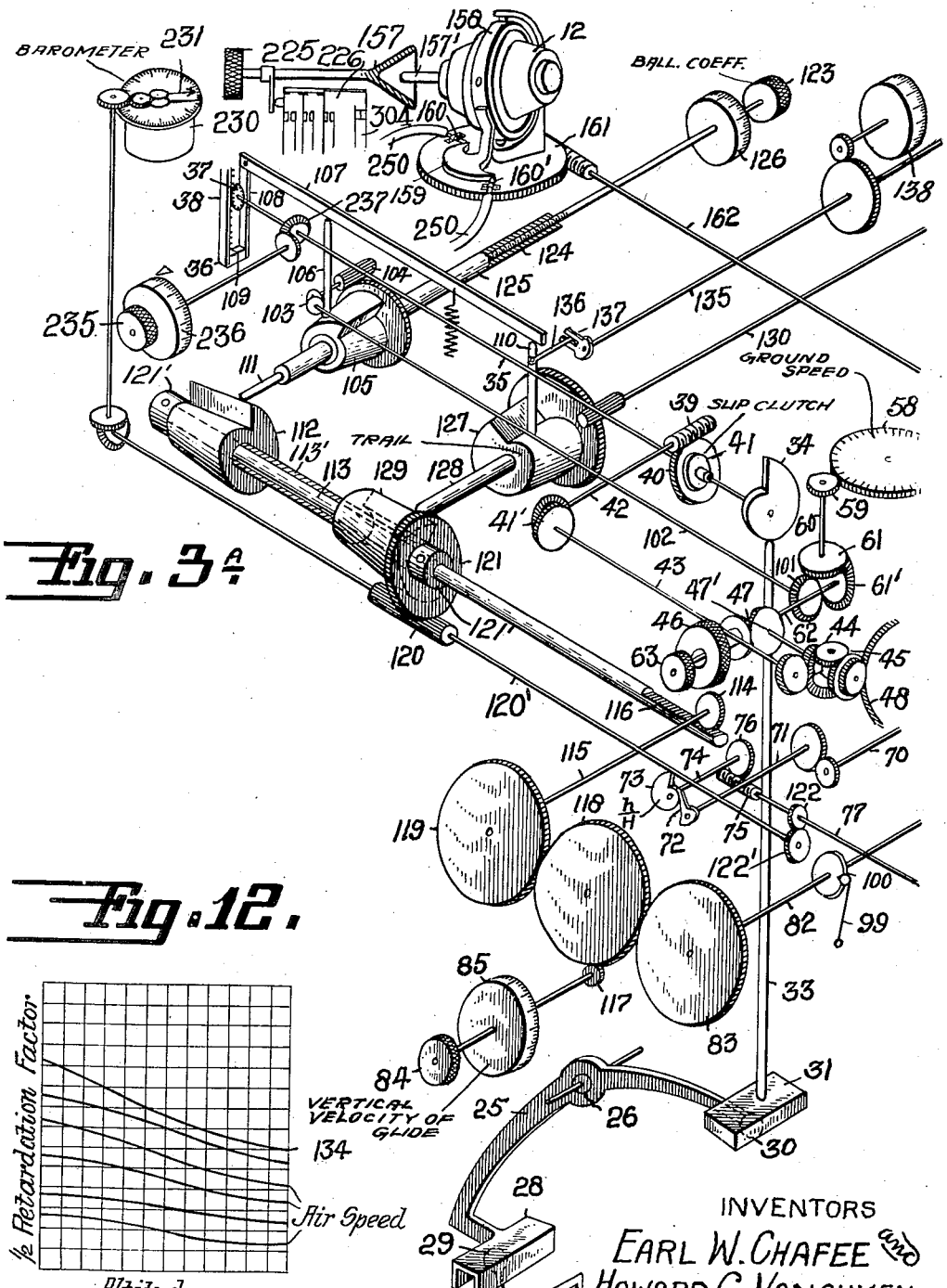
Fig. 3ᴬ
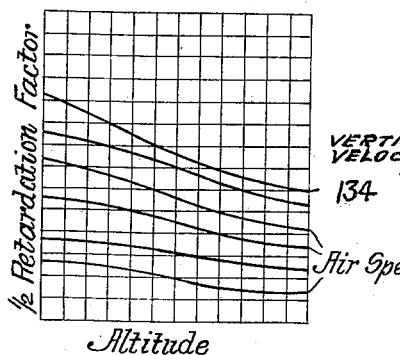
Fig. 12.
INVENTORS
EARL W. CHAFEE and
HOWARD C. VANAUKEN
BY Herbert H. Thompson
THEIR ATTORNEY.

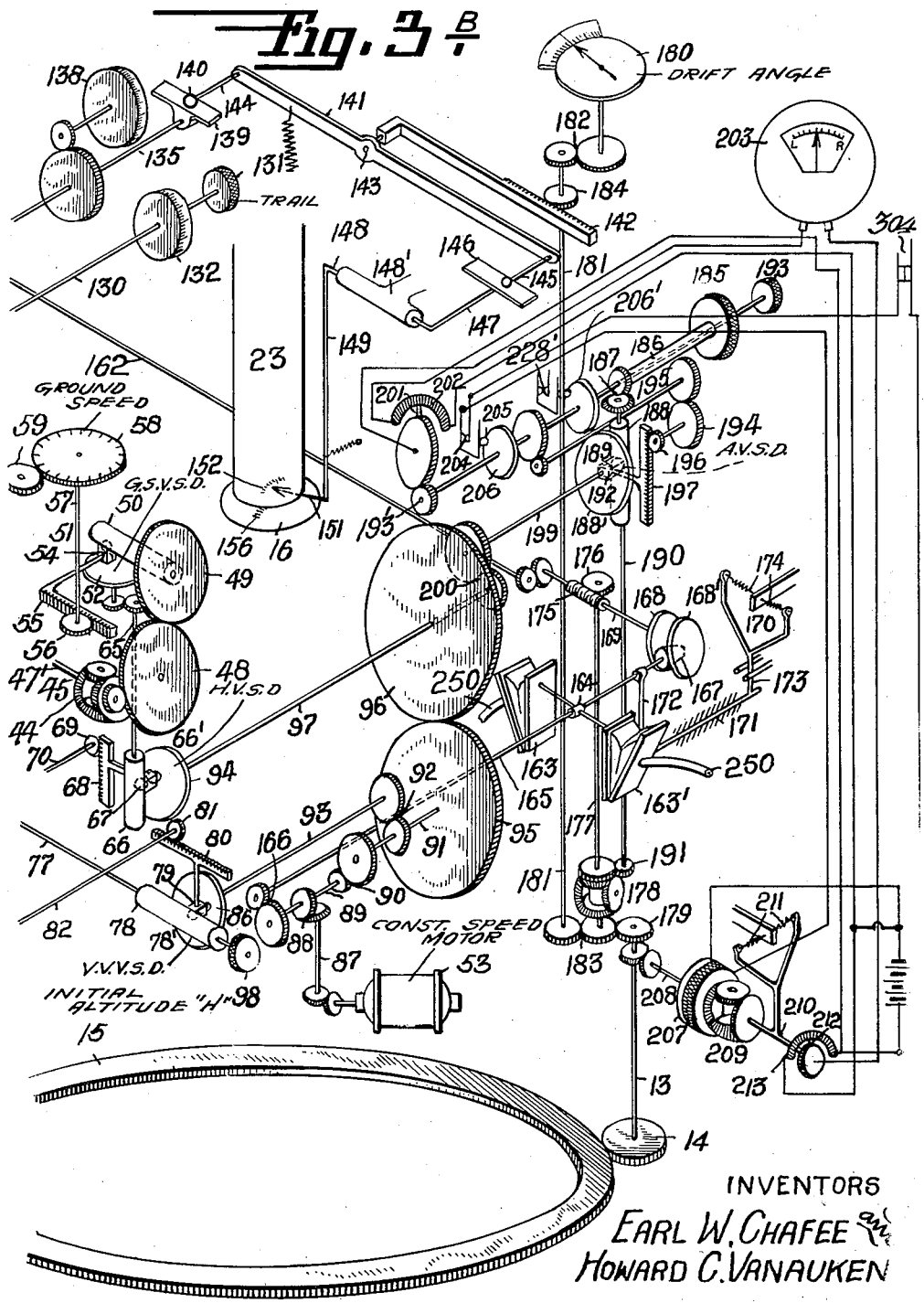

March 20, 1945.  E. W. CHAFEE ET AL  2,371,606
BOMB SIGHT
Filed Feb. 26, 1937  6 Sheets-Sheet 4
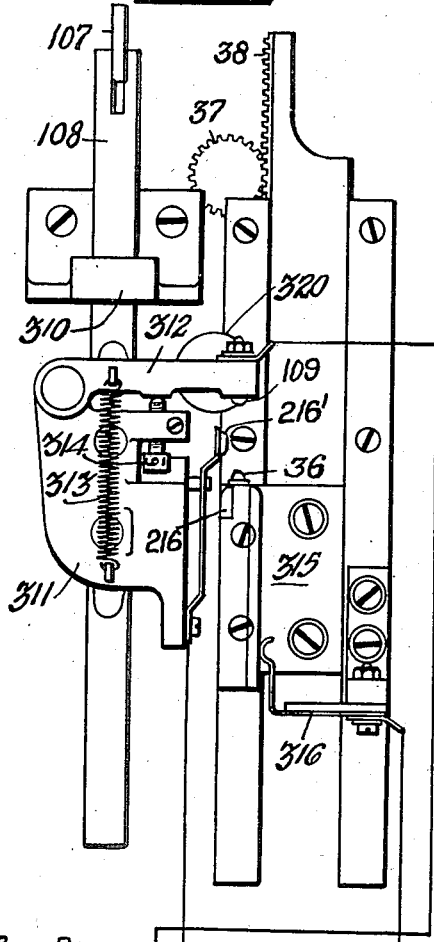
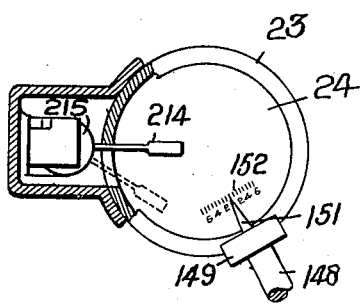
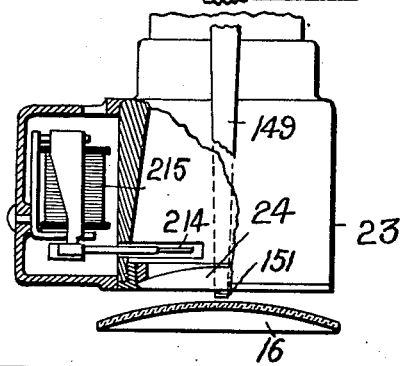
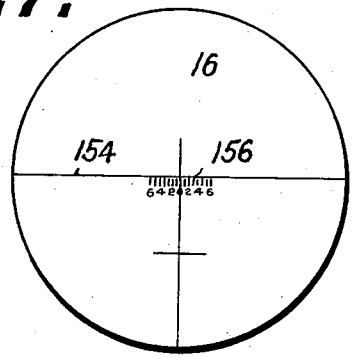
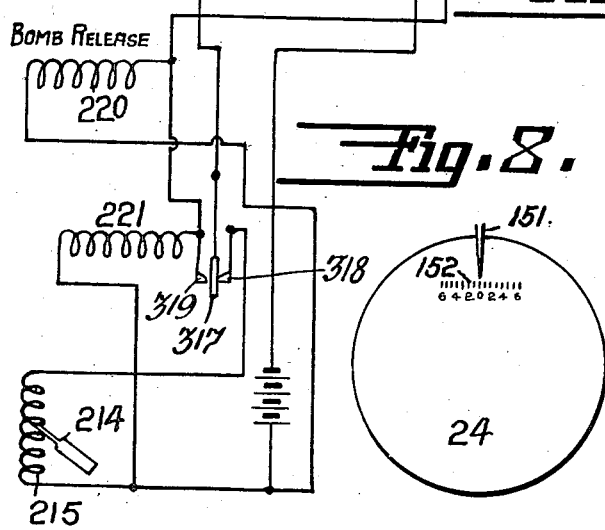
INVENTORS
EARL W. CHAFEE
HOWARD C. VANAUKEN
BY
Herbert H. Thompson
THEIR ATTORNEY.

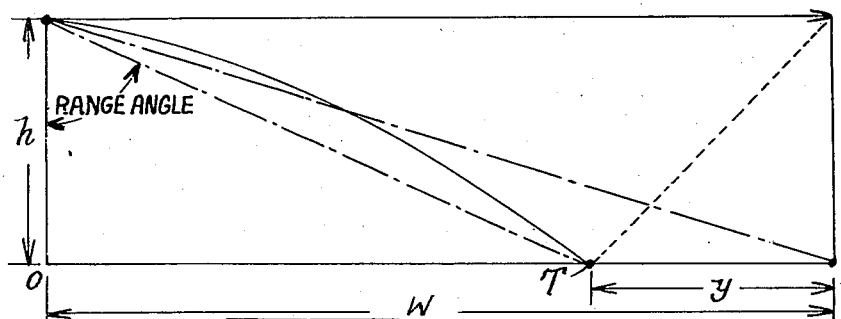
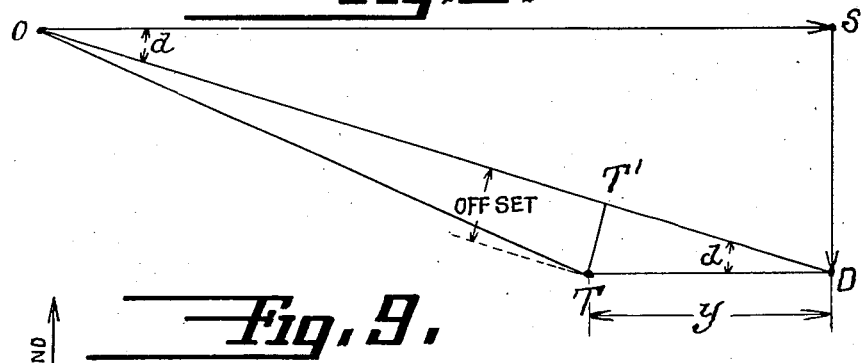
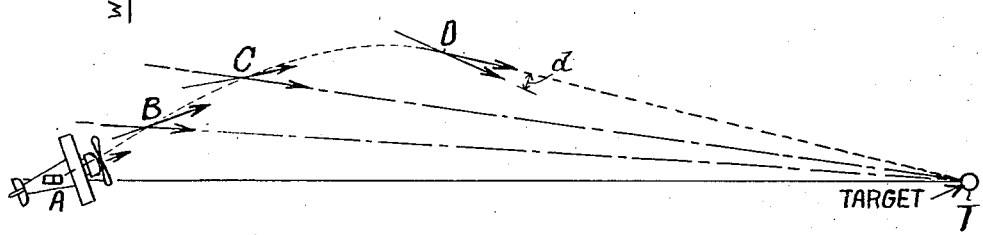
INVENTORS
EARL W. CHAFEE
HOWARD C. VANAUKEN
BY
THEIR ATTORNEY.

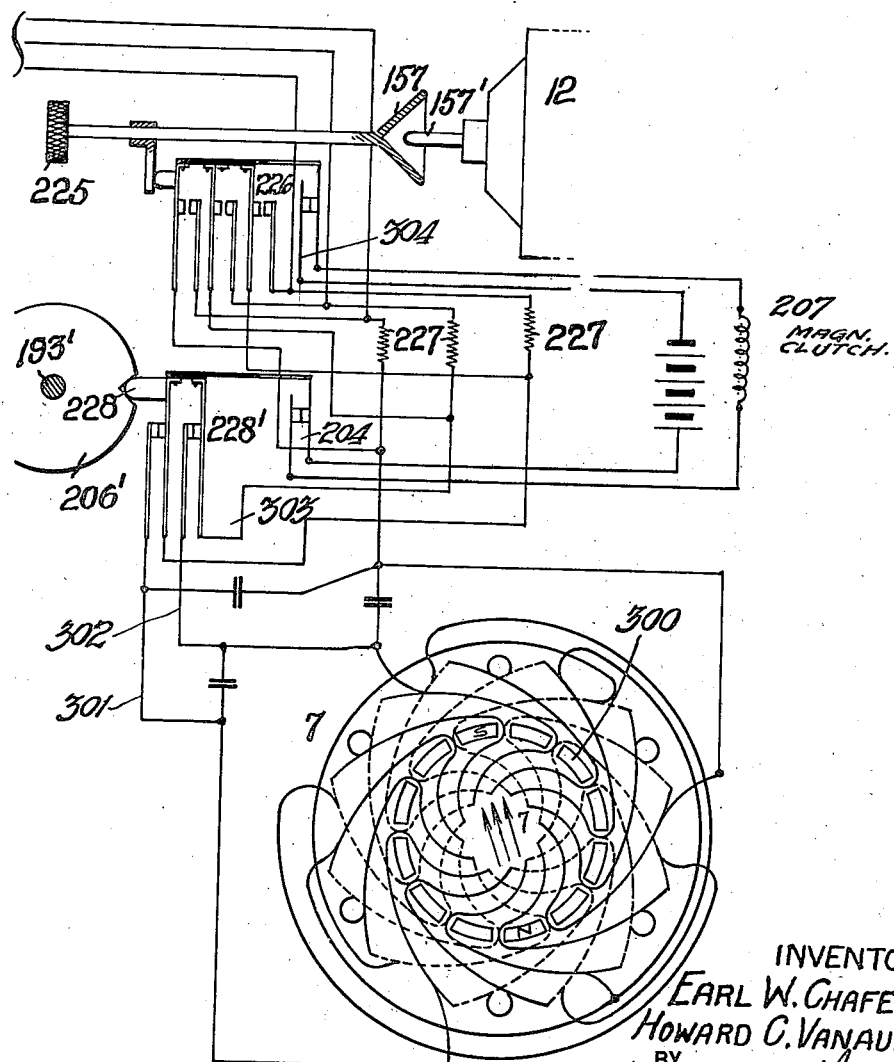

Patented Mar. 20, 1945

2,371,606

UNITED STATES PATENT OFFICE 2,371,606

BOMB SIGHT

Earl W. Chafee, New York, N. Y., and Howard C. Van Auken, Bloomfield, N. J., assignors to Sperry Gyroscope Company, Inc, Brooklyn, N. Y., a corporation of New York Application February 26, 1937, Serial No. 128,034

28 Claims. (Cl. 33—46.5)

This invention relates to bomb sights for aircraft which are designed to direct the course of the craft so that its ground track, except for offset, would pass through the target in a straight line and which determine the exact point at which the bombs should be released to strike the target. The mechanism also preferably computes and sets in automatically the amount of offset necessary to compensate for side drift due to side winds.

More particularly, our invention constitutes an improvement in existing sights, whereby the optics of this system are improved by an improved method of stabilization both as to rolling and pitching and in azimuth.

Heretofore, also, bomb sights could only be used accurately when the aircraft maintained the same altitude during the sighting operation. In accordance with our improvement, however, the sight may be used when the craft is descending or ascending uniformly, which we term broadly gliding.

A further improvement consists in the method of arriving at and determining when the straight ground track toward the target is reached, and in the pilot directing system associated therewith.

A further improvement consists in the method of determining the range angle from ground speed, and trail. By our invention, also, the determination of offset and its introduction is improved.

Referring to the drawings, showing one form our invention may assume,

Fig. 1 is a vertical section through the improved form of stabilized sight.

Fig. 2 is a plan view of the same, cut in half.

Fig. 3A and Fig. 3B together constitute a diagrammatic layout of the computing mechanism of the sight, Fig. 3A being the left hand portion of the diagram and Fig. 3B the right hand portion thereof.

Fig. 4 is a detail of one form of bomb release contact mechanism.

Fig. 5 is a bottom plan view of the eye piece lens, showing the bomb dropping signal which is operated at the time the bomb is to be released, and the offset indicator.

Fig. 6 is a side view of the same, partly in section.

Fig. 7 is a plan view of the stabilized reticle, showing the scale thereon.

Fig. 8 is a similar view of the graduated eye piece or secondary reticle with the offset scale thereon.

Fig. 9 is a diagram showing how the airplane arrives at the straight ground track towards the target in the presence of a side wind.

Fig. 10 is an elevation diagram showing the theory of operation of the sight.

Fig. 11 is a plan view of the vectors involved in cross wind bombing.

Fig. 12 is a plan view of a chart used to obtain the setting of the retardation factor in our machine.

Fig. 13 is a supplemental wiring diagram.

Referring first to Figs. 1 and 2, we prefer to employ an artificial horizon, such as some form of gyroscope 1, to stabilize the optics against rolling and pitching. As shown, the gyro rotor casing 1 is universally mounted within a supporting rotatable framework 2 by means of a gimbal ring 3, the gimbal being pivoted on major axis 4—4, and the gimbal ring, in turn, supporting the gyro casing 1 on minor axis 5. The gyroscope is preferably mounted in neutral equilibrium, but is equipped with a power-actuated erection device, such as provided by a pendulous inductor controller 6 and an A. C. stator supplied with three phase current, producing a rotating field, which stator winding 7 cooperates therewith, in the following manner. The controller 6 carries a copper ring 6' which is so located that it can move in close proximity to the stator 7. This stator has a flat three phase winding and is supplied with three phase alternating current. The flux created by the windings rotates around a vertical axis. As long as the ring 6' is concentrically positioned with respect to the axis of the windings, no reaction occurs between the ring and the flux. If, however, the ring 6' is in an eccentric position due to a tilt of the gyro, eddy currents will be created in the ring, tending to propel the ring out of the flux field in a tangential direction. The amplitude of the eddy currents is substantially proportional to the angular misalignment between ring and stator, and the resulting torque therefore precesses the gyro in a straight line back toward the point of concentricity at a speed substantially proportional to the misalignment, so that the gyro axis arrives at the true vertical at zero speed.

In the wiring diagram in Fig. 13, 7 is the three phase winding on stator 300. The supply lines 301 and 302 can be interrupted by switch 228' actuated by a pin 228 operated by notched disc 206', while line 303 is not interrupted. Three resistors 227 are connected in series with the supply lines and may be shorted out by switch 226, operated by the caging knob 225 of the azimuth gyro 12. If these resistors are in the circuit, current in the winding 7 is reduced, thereby decreasing the erection torque. If disc 205' is rotated so that pin 228 opens switch 228', the erection is cut off altogether. Other erecting means, actuated by other mediums, may be used with equal success without in any way changing the general principle of the above described device, which is more fully described in the copending application of O. E. Esval and C. A. Frische, Serial No. 64,004, filed February 15, 1936, for Electromagnetic erecting means for gyroscopes.

Preferably, the entire outer framework skirt 2 is mounted for rotation within a fixed frame 9 by means of roller supports 10, on which a circular inclined trackway 11, secured to frame 2, rests. Guide rollers 11' may also be provided at the bottom of the skirt 2. Said skirt 2 is normally maintained fixed in azimuth from a directional gyroscope 12 (Fig. 3A), as hereinafter described, as by means of a shaft 13 carrying a pinion 14 meshing with an annular gear 15 on the bottom of frame 2, so that the entire gyroscope and its connected optics is so stabilized.

On the top of the gyro casing 1 is mounted the reticle 16, which therefore is stabilized about all three axes. While stabilization of the reticle has been found sufficient for some purposes, we prefer to also stabilize against rolling at least the main target following reflecting prism or mirror 17 and the intermediate prism 18. To this end, both of said prisms are shown as mounted on forwardly extending arms 19 from gimbal ring 3, said arms passing around the forward gimbal pivot 4, as shown in Fig. 2. Said prisms therefore are stabilized against rolling, although not necessarily stabilized against pitching. Prism 17 is shown as pivoted on transverse axis 32 in said arms 19 so that it may be tilted to follow the target. By so stabilizing the reflecting prism, the "false yaw" of the craft, i. e. the apparent yaw of the line of sight due to rolling of the craft, is eliminated.

From intermediate prism 18, the line of sight passes vertically upwardly into the objective lens system 20 which focusses the image of the ground in the plane of the reticle 16, which is located above but laterally displaced from the lens. Preferably, the reticle is directly over the center of the gyroscope and the line of sight from the objective lens is displaced laterally to the center of the gyroscope and thence upwardly through reflecting prisms or mirrors 21 and 22. The objective lens and prisms are mounted on the rotatable frame 2, but are not shown stabilized from the gyroscope, as this is unnecessary, said parts being mounted on a bracket 27 secured to frame 2. Finally the image projected on the reticle is viewed from a telescopic eye piece 23 having a scale 152 (Fig. 5) at the bottom of lens 24.

For causing the prism 17 to follow the target, we have shown a bell crank lever 25 pivoted at 26 on the frame 27 supporting the objective lens and having at its lower end a transversely positioned channel member 28 engaging a knob 29 projecting upwardly from the back of the metal mounting of the prism 17. Therefore any movement of the bell crank lever in the plane of the paper in Fig. 1, that is, fore and aft of the craft, will rock the prism to follow the target, but rolling of the craft will not affect the prism, since the prism is stabilized from the gyroscope and the knob 29 will merely slide back and forth in the channel 28. The bell crank lever 25 is rocked by the engagement of its upper end 30 with a member 31 moved by the computing mechanism of the sight, the lever being shown as having a knob on the end thereof to be engaged by the member 31.

The computing mechanism is principally for the purpose of determining the point at which to release the bomb. The horizontal distance from the target to the projection of this point on the ground is known as the range, and the angle that the line of sight makes at this time is the range angle. It is also for the purpose of determining the true ground course of the craft and for directing the pilot so the bomb's trajectory will intersect the target.

For turning the prism about its pivotal axis 32 to maintain the same on the target, we have shown the knob engaging member 31 as moved up and down from a spring 31' and a rod 33, which rod, in turn, is moved by the rotation of the sight angle cam 34. Said cam is shown as mounted on a shaft 35 which also moves the moving contact 36 on the bomb release mechanism, said shaft being shown as having a pinion 37 thereon meshing with a vertical rack 38 carrying the contact 36 (see also Fig. 4). Said shaft 35 is shown as driven by means of a worm 39, a worm wheel 40 and a slip clutch 41 from shaft 42, which, in turn, is driven through bevel gears 41' from shaft 43, which, in turn, is driven through gears 44 from one side of the differential 45. Initial setting of the prism on the target may be accomplished by a knob 235, to which a sight angle scale 236 may be secured. Said knob is geared directly through bevel gears 237 to shaft 35 to turn cam 34. Another arm of said differential is shown as driven from the prism setting knob 46 through bevel gears 47 and shaft 47', while the third side of said differential is driven from large gear 48, shown as driven from a second gear 49 (Fig. 3B), secured to the driven member or cylinder 50 of the ground speed variable speed drive mechanism 51 (GSVSD).

Said mechanism is shown as consisting of a disc 52 rotated (indirectly and variably) from a constant speed motor 53, as hereinafter described, and also a roller or rollers 54 radially displaceable on said disc, and for this purpose shown as secured to an arm projecting from a movable rack bar 55 which is moved from a pinion 56 secured to the shaft 57 of the ground speed dial 58. Said shaft and dial, in turn, are shown as driven from pinion 59 on shaft 60 (Fig. 3A), which, in turn, is driven through bevel gears 61 and 61' from a shaft 62 which carries at its outer end the ground speed synchronizing knob 63. Therefore it will be apparent that by adjusting the ground speed synchronizing knob 63, the rollers 54 may be positioned in such position as to maintain the prism on the target, at which time the ground speed will be indicated on the ground speed dial 58. Accurate adjustment of the prism is accomplished by turning knob 46, without changing the rate.

As stated above, however, the disc 52 is not rotated directly from the motor 53, but other variable speed factors are interposed to take care of the effect of altitude on the sight problem, and also the effect of continuous changes in altitude. As shown, the disc 52 is rotated from a shaft 65 which carries a roller 66 of a second variable speed drive which we may term the altitude variable speed drive 66' (HVSD). In said drive the radially displaceable balls 67 are moved from rack bar 68, which is positioned from a pinion 69 on shaft 70, which, in turn, is rotated from a shaft 71. Shaft 71, in turn, is positioned by means of a cam finger 72 thereon which engages a cam 73, which we term the altitude ratio cam or $$\left(\frac{h}{H}\right)$$

cam, where H is the actual altitude of the craft and $h$ the altitude (say 5000 feet) taken as unity in the design. With this H, the altitude ratio for 20,000 ft. altitude would be ¼. Said cam is shown as mounted on a shaft 74 which is driven from a worm 75 through worm wheel 76 mounted on shaft 74.

Said shaft 77, in turn, is shown as rotated from the cylinder 78 (VVVSD) of a third variable speed drive 78', which we term the glide or vertical velocity variable speed drive and which is for the purpose of introducing the compensating factor for changes of altitude, i. e., for gliding (or climbing) of the craft during the target approach. The rollers 79 thereof are shown as positioned radially from a rack bar 80 moved from a pinion 81 on shaft 82, which is rotated from a large gear 83 turned from a knob 84, by means of which the vertical velocity of glide $V_0$ is set in, the value of which is indicated on a dial 85. The rotating disc 86 of said variable speed drive is shown as driven from the constant speed motor 53 through shaft 87, bevel gears 88, shaft 89, gears 90, shaft 91, gears 92, and shaft 93, which carries said rotating disc. The motor 53 also drives the rotating disc 94 of the altitude variable speed drive 66' by means of a large gear 95 on shaft 91, driving gear 96 on the shaft 97 of disc 94.

The setting knob 98 is for the purpose of setting in the initial altitude, which turns shaft 77, slipping the roller 78 over the balls 79 without changing their setting.

A finger 99 engages in a notch 100 in a disc on shaft 82 when the aircraft is flying horizontally, i. e., when it has zero vertical velocity or no glide. At this time the balls 79 are at the center of the disc 86.

The data or values which are secured from the above described settings and variable speed drives are then set into the mechanism for computing the range angle or whole range and, with additional settings, the trail and offset. The cam 34 is so laid out that the rate of rotation of the shaft 35 thereof is directly proportional to the linear ground speed. In other words, if the aircraft is approaching the target at a uniform rate, the shaft 35 will be revolved uniformly in spite of the fact that the prism rate will slowly increase as the target is approached. Therefore the radial position of the balls 54 on the ground speed variable speed drive 51' is directly proportional to ground speed, the speed of the disc 52 being varied in accordance with the altitude ratio from the variable speed drive 66'. This position is indicated on the ground speed dial 58 and transmitted through pinion 59, shaft 60 and gears 61, 61', with which meshes a gear 101 on shaft 102 which drives through bevel gears 103, an elongated pinion 104 which positions rotationally one cam 105 of several novel three-dimensional cams. Cam 105 combines the ground speed ($G_s$) with a factor proportional to the time of fall of the bomb ($T_e$) and the altitude ratio so that the lift of the pin 106 thereon represents whole range (W) in accordance with the equation $$W = T_e \times G_s \times \left(\frac{h}{H}\right)$$

Said pin is shown as bearing at its upper end against a long lever 107, one end of which is pivoted to a vertical rod 108 carrying the so-called fixed contact 109 of the bomb release mechanism. Said lever is also positioned, however, by a second pin 110, the lift of which represents the trail, so that the lever operates to subtract trail Y from the whole range W to give the true range. The cam 105 is positioned axially by the lift of a third cam pin 111 resting on a second three-dimensional cam 112, to give it a lift proportional to $$T_e \left(\frac{h}{H}\right)$$

A consideration of the problem of bomb dropping from a gliding aircraft will show that not only is the altitude (H) changing, but that the time of fall ($T_e$) will be affected by the vertical velocity of the craft ($V_0$) at the time of release of the bomb, since that is a factor determining the average rate of fall. Therefore we position cam 112 in accordance with two factors, one, axially in accordance with $V_0$ and, two, angularly in accordance with the instantaneous altitude at the time of release. To this end, said cam is rotatably but non-slidably mounted on a shaft 113, said shaft being positioned axially by means of a pinion 114 on shaft 115, which meshes with rack teeth 116 on said shaft. Said cam 112 is shown as non-rotatably mounted on a sleeve 113' which also carries cam 129 and gear 121, hereinafter described, said sleeve being prevented from longitudinal movement by fixed collars 121' on shaft 113. The pinion 114 is shown as set in accordance with the vertical component velocity of glide ($V_0$) (i. e., the rate of change of altitude) from the knob 84, the rotation of which rotates pinion 117 meshing with large gear 118, which, in turn, meshes with gear 119 on shaft 115. When the airplane is flying horizontally, knob 84 is set so that the dial 85 reads zero, at which time the detent 99 is in notch 100, as stated above.

The cam 112 is positioned rotationally from a long pinion 120 meshing with a large gear 121 secured to sleeve 113'. Pinion 120 is shown as rotated from the shaft 77 of the variable seed roller 78 through intermeshing gears 122 and 122', the latter on the shaft 120' of pinion 120. It will be remembered that the shaft 77 is initially positioned from knob 98 in accordance with the altitude, and if the plane is gliding, it is continuously rotated so as to rotate shaft 77 in proportion to the rate of change of altitude by means of the variable speed drive 78'. Therefore the cam 112 is positioned axially in accordance with the vertical velocity of glide and rotationally according to the instantaneous altitude, the cam being laid out so that the lift of the pin represents the time of fall combined with the altitude.

The altitude is continuously indicated on aneroid barometer 230, the shaft 120' turning the matching pointer 231 thereon to keep this pointer matched with the pointer on the barometer, the initial setting being accomplished by turning knob 98, the changes in altitude during a glide being continuously introduced through the $V_0$ variable speed drive 78'.

Since, however, bombs vary in their characteristics, shape, density, etc., we provide an additional correction device for the axial positioning of the cam 105 to take care of the so-called ballistic coefficient of the bomb. This correction takes care of the difference in time of fall for bombs with different ballistic coefficients. This may be provided from a setting knob 123 mounted on an extension of shaft 111 which is threaded at 124 into an enlarged extension 125 from cam 105. The ballistic coefficient is set on dial 126 by knob 123.

The trail lift pin 110 is shown as actuated from a third three-dimensional cam 127 so that the lift thereof Y=

$$\tfrac{1}{2}RT_e^2\left(\tfrac{h}{H}\right)$$

where R is the retardation factor of the bomb. Cam 127 is positioned axially from the lift of a pin 128 resting on a fourth three-dimensional cam 129. Cam 129 is shown as mounted on the same sleeve 113' as cam 112, but it is laid out so that the lift of the pin 128 is in proportion to the square of the time of fall $(T_e)^2$ and the altitude ratio. Cam 127 is positioned rotationally from shaft 130, which is set from setting knob 131.

Offset mechanism

From an inspection of Figs. 10 and 11 it will be seen that the offset TT' may be written as Y sin d, where Y is the trail. It will also be observed from similar triangles that angle d, that is angle TDT'=angle T'OS, or in other words, is equal to the drift angle. Since the lift of the pin 110 is the trail Y, we combine this factor with the sine of the drift angle to obtain the offset. For this purpose, the cam pin 110 is shown as turning, by its up and down movement, a shaft 135 by means of a laterally extending pin 136 which engages a forked arm 137 on shaft 135. Said shaft not only turns the trail dial 138, but also rocks a member 139 (Fig. 3B) having a flat inner surface about the center of shaft 135. On said member rests a knob 140 on an extension 144 from a pivoted but laterally slidable arm 141, so that said knob 140 may be moved to either side of the vertical position over shaft 135. Said arm is shown as positioned laterally by means of a rack bar 142 which carries said arm on a pivot 143, permitting free oscillation of the arm upon said pivot. At the other end of arm 141 there is a similar knob 145. It will therefore be seen that if there is trail present and at the same time the knob 140 is displaced to one side or the other of its central position, the arm or lever 141 will be rocked, this also moving up and down a plate 146 on which knob 145 rests. On the bottom of said plate is shown as resting an arm 147 extending from a shaft 148 journaled in bearing 148'. Another arm 149 extends downwardly from said shaft 148 beside the observing telescope 23, and carries at its lower end a laterally displaceable pointer 151 readable on a scale 152 on the bottom lens of the telescope or eye piece 24 (see Figs. 3B, 5, 6 and 8). The observer notes the reading of the pointer on said scale and thereafter, instead of aligning the cross hairs 154 of the main reticle 16 (Figs. 6 and 7) on the target, he aligns the numeral on the main scale 156, indicated by the pointer on the scale 152, on the target, thereby compensating for offset.

Azimuth stabilizing and aligning mechanism

As stated above, the sight is maintained stabilized in azimuth from the directional gyroscope 12. Said gyroscope is shown as of the usual type which may be caged and uncaged by caging device 157 which engages pin 157' on the gyro casing. The vertical ring 158 thereof is shown as carrying some form of controller for maintaining the optical system fixed in azimuth. As shown, this comprises a cutoff segment 159 with which cooperates a pair of ports or air nozzles 160 and 160', which are preferably mounted on a rotatable platform 161 rotated from the follow-up shaft 162. Said nozzles differentially control, through pipes 250, a pair of bellows or other air pressure devices 163, 163', which are oppositely coupled to a sleeve 164, within which is journaled a pivoted shaft 165 continuously rotated from the motor 53 by means of gears 166. At the end of said shaft is shown a friction cone or roller 167 which is adapted to engage, on lateral displacement of said shaft, one or the other of drive discs 168, 168' by means of which a shaft 169 is driven in one direction or the other. The cone is normally maintained in its central or non-driving position by means of a spring centralizing mechanism 170 comprising a double ended bracket 171 having two upstanding arms 172 and 173, through the former of which passes the shaft 165 and the latter of which is centralized by centralizing springs 174. Shaft 169 is shown as rotating the frame 2 through worm 175 worm wheel 176, shaft 177, differential 178, gear 179, shaft 13, pinion 14 and large pinion or gear 15 on the base of rotatable member 2.

The drift angle may be shown by a dial and pointer 180 actuated from the shaft 181 through gears 182, the shaft 181 being geared to shaft 177, rotated with the shaft 13 through gears 183. Shaft 181 also carries the pinion 184, which meshes with the rack 142 of the offset mechanism, thereby introducing sin d into the offset mechanism.

For initially setting the sight on the target, there is shown an azimuth setting knob 185 (Fig. 3B) mounted on a sleeve 186 which directly turns, through bevel gears 187, the cylinder 188 of the azimuth variable speed drive 189 (AVSD). Said roller is shown as mounted on a shaft 190 which actuates, through pinion 191, the middle arm of the differential 178 so that turning of the knob 185 directly rotates the sight in azimuth without affecting the position of the balls 192 of the azimuth variable speed drive 189. For positioning said balls we have shown a second knob 193 which rotates a gear 194 through intermediate idling shaft 195. On the shaft of the gear 194 is a pinion 196, which meshes with rack teeth on bar 197, which carries the balls 192. The driving disc 188' of said mechanism is shown as continuously driven from the motor 53 through shaft 199, gears 200, shaft 97, large gears 96, 95, etc., the motor thus directly driving all of the discs 86, 94 and 188' of the three variable speed drives, the azimuth 189, the vertical velocity 78', and the altitude drives 66'.

Referring to Figs. 9 and 13, representing the method of approach to the target, during the preliminary approach the azimuth gyroscope is caged by pushing in knob 225. This also closes contacts 226 to fully energize the windings 7 on the gyro-vertical to give quick settling thereof. At the point A the bomber turns the bomb sight optics so that the line of sight intersects the target and at this point he uncages the azimuth gyroscope so that the optical line of sight is stabilized in azimuth. This also opens contacts 226, removing the short circuit of resistances 227 and thus reducing the erective force to normal. It also closes contact 304, hereinafter described. In the presence of a side wind, represented by the arrow, the plane will move along the dotted course and the reticle wire will move off the target to the left at a rate proportional to the angle between the original line of sight AT and the ground course line A—B. The bomber will then turn the azimuth synchronizing handle 193, which displaces the balls in the azimuth variable speed drive 189 and causes the sight to turn slowly to the right. Turning the hand wheel 193 also displaces the contact finger 201 on a rheostat 202, causing the pointer on the zero reading pilot director 203, which may be of the zero reading voltmeter type, to deflect to the right, thereby signalling the pilot to make a turn into the wind at a greater rate than, preferably double, the rate that the sight is being turned. It also moves finger 228 out of the notch on cam 206' to open contacts 228', shown schematically as a single contact in Fig. 3B, but fully shown in their circuit relation in Fig. 13, to break the circuit to windings 7 and thus eliminate all erective force as long as the craft is turning, so that the gyroscope is then truly free. The pilot will continue to turn as long as the balls are displaced from the center of the disc and the line of sight is turning relative to the stabilized line, but as the point D is approached, the hand wheel 193 will gradually be brought back toward zero, thus reducing the rate of turn of the sight and the rate of turn of the craft. When the plane has reached the point D, a straight ground course or track will intersect the target. At this point the reticle will stay on the target without turning the sight, and the rate of turn of the sight becomes zero. The balls in the variable speed mechanism 189 will therefore be in the center of the disc 188' and the contact finger 201 on the rheostat will be in the central position. The pilot director will therefore read zero and the pilot will fly a straight course from there on, and the normal erecting force will be restored.

Preferably, at this time we make a contact 204 by the dropping of the detent 205 into a notch on disc 206 on the shaft 193' of knob 193. In actual practice, discs 206 and 206' are combined, and the switches 204 and 228' are also combined into a multiple blade switch, operated by finger 228. They are shown separately in Fig. 3B for the sake of simplicity. The contact 204 is in circuit with contact 304 and with a small magnetic clutch 207 which operates to lock, when excited, the center arm of differential 209 so as to cause a shaft 208, driven from shaft 13 and connected to one arm of said differential gear 209, to turn the other arm which is connected to a bracket 210 and normally centralized by springs 211. The clutch can only operate if both contacts 204 and 304 are closed, which is only possible after the approach to the target has reached the straight ground track. Movement of bracket 210 turns contact finger 212 on a second rheostat 213 in circuit with pilot director 203. The pilot director is such that it will be operated when either contact 201 or 212 is displaced from the central position. As shown in Fig. 3B, the two rheostats 202 and 213 are connected in parallel across the terminals of the battery or other source of E. M. F., B, and the moving finger 201 and 212, respectively, of each rheostat is connected to the opposite terminals of the pilot director or turn signalling device 203. Therefore, when both of said fingers are in the mid position or in the same relative position on the rheostat, no signal will be shown on the indicator because the drop through each rheostat is the same. When, however, either rheostat is moved off this position, a turn will be signalled in one direction or the other, depending upon the direction of movement. When the straight ground track is reached, the magnet 207 is energized, which will then displace contact 212 in case of any departure of the craft from said straight ground track, thereby signalling the pilot to turn back to the straight ground track. At that time contact 201 is centralized.

It is also obvious that an automatic steering gear might be used in place of the pilot director or turn signalling device 203, the electric impulses operating to turn the rudder directly from the automatic pilot.

In Figs. 5 and 6, a little flag 214 is moved by a magnet 215 from one position to the other shown in Fig. 5, as a warning that the bomb is to be released, the magnet 215 being in circuit with the so called warning contacts 216 and 216' on the bomb dropping mechanism shown in detail in Fig. 4. When this signal is set, the pilot either presses a button to drop the bomb or the bomb is dropped by the contact of contact buttons 36 and 109, which are in circuit with the bomb release solenoid 220, relay 221 deenergizing magnet 215 at this time.

The bomb dropping mechanism shown in Fig. 4 operates as follows: the lever 107, which is positioned by the cam pins 106 and 110, raises or lowers, as the case may be, a bar 108 guided for vertical motion by the bearing 310. Bar 108 carries a block 311, on which there is mounted pivoted arm 312, carrying the insulated contact 109, held in position by spring 313 against an adjusting screw 314. Block 311 also carries a spring supported insulated contact 216', which is adapted for sliding engagement with contact 216, carried on slider 315, which in turn is operated through a rack 38 from pinion 37. Also carried on the slider is the contact 36 which, when engaging contact 109, causes the closing of the bomb dropping circuits. A fixed sliding spring 316 serves the purpose of conducting current to the contacts 216 and 36.

As the success of the bombing operation depends largely upon the time at which the bomb is dropped, it is evident that it is very important to prevent the bomb dropping contacts from burning, as that would be equivalent to a gradual change of their relative position. This novel bomb dropping mechanism achieves this in the following way, which allows the contacts to make a circuit but prevents them from ever breaking a circuit, thereby eliminating the formation of a destructive arc. When the block 311 and the slide 315 approach each other while the aircraft approaches the target, contact 216' will eventually engage contact 216 and thereby close a circuit containing the relay 215 operating the warning signal 214. Next, contact 109 touches contact 36, closing two parallel circuits, one containing the bomb release relay 220 and the other containing the transfer relay 221. Relay 221 moves switch arm 317 so that it breaks contact with arm 318 and makes contact with 319, thereby first deenergizing the warning relay 215 and then shorting the contacts 109 and 36, so that these contacts carry no longer any current. At the same time control of relays 220 and 221 has been transferred to the contacts 216 and 216', so that both relays will stay energized until these contacts are separated. As the relative motion of slider 315 and block 311 may continue for a while after the bomb is dropped, arm 312 will be turned counter-clockwise until a roller 320, made of insulating material, comes to rest on contact 216, thereby lifting contact 109 from contact 36 so that no mechanical sliding motion can gradually abrade these contacts. During the return of the slider 315 and the block 311 to their initial position, contacts 36 and 109 remain shorted until contact between points 216' and 216 is broken, which happens long after contacts 109 and 36 have been separated. This combination of contacts and relays makes it possible to maintain the mechanical dimensions of the main contacts so that after thousands of operations no change is measurable, which could not be accomplished if the contacts have to draw an arc every time they are separated.

The importance of varying and eliminating the erecting force on the gyro-vertical in the bomb sight, as shown in Fig. 13, may be realized when it is remembered that the exact stabilization of the optics during the target approach is essential to accurate bombing. Neither a truly neutral gyroscope nor a gyroscope at all times erected at the normal rate, such as a Sperry artificial horizon, is suitable for this purpose because a neutral gyroscope will not stay vertical for any length of time because of friction and because of the earth's rotation, while an erected gyroscope is subject to deflection by the action of acceleration forces on the pendulous erecting device during turns of the craft. Such deflection is directly proportional to the comparative strength of the erecting device, i. e., to the normal erection rate, so that by making the erecting device much weaker than ordinarily employed, during the target approach, the disturbing effect of any turn at this critical time is kept a minimum. Such deflection is further practically reduced to zero by eliminating the erecting effect during signalled turns. However, when such force is made very weak, say of such a strength as to erect the gyroscope at a rate of less than a degree a minute, too much time may be taken in bringing the gyro-vertical into the vertical after releasing. Therefore we prefer to increase the erecting force materially above normal, to erect the gyroscope at the rate of, say, 10 degrees a minute or more, just prior to the time that the target approach is begun, that is, prior to the time that the directional gyroscope is uncaged. By this combination greatly improved results have been secured in practice.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A time of fall mechanism for adapting bomb sights for a gliding approach, including means for setting in the present altitude, means for setting in the rate of change of altitude due to glide, a variable speed device set from said second means and adapted to alter the altitude setting at a rate proportional to the rate of change of altitude, and cam means also set from said second means for correcting the calculated time of fall for the initial downward velocity of the bomb when released from the gliding aircraft.

2. In a bomb sight, computing mechanism for determining time of fall, a three dimensional cam and cam pin which are relatively positioned axially and rotationally of the cam in accordance with the component vertical velocity of glide or rate of change of altitude and the instantaneous altitude, including means for originally positioning said cam in one direction in accordance with the initial altitude, means for continuously moving said cam in said direction at a rate proportional to the change of altitude, and means for moving the cam in the other direction through a distance proportional to said vertical rate, said cam being so laid out that the lift of the pin thereon is a function of the time of fall of the bomb.

3. In a time of fall computing mechanism for bomb sights, a three dimensional cam and cam pin relatively positionable axially and rotationally of the cam, means for relatively positioning said cam and pin axially in accordance with the rate of change of altitude of the craft, means for positioning the same rotationally in accordance with the initial altitude, and means for turning the same at a rate proportional to the change of altitude, said cam being so laid out that the lift of the pin is a function of the instantaneous altitude and vertical velocity at the time of release.

4. A bomb sight computing device as claimed in claim 3, a second three dimensional cam positioned axially from the lift of said first mentioned pin, and means for positioning said cam rotationally in accordance with the ground speed of the craft, said second cam being so laid out that the lift of the pin thereon represents the whole range angle.

5. In a bomb sight computing mechanism for computing the trail, a three dimensional cam and cam pin which are relatively positioned axially and rotationally of the cam in accordance with the component vertical velocity of glide or rate of change of altitude and the instantaneous altitude, including means for originally positioning said cam in one direction in accordance with the initial altitude and means for continuously moving said cam in said direction at a rate proportional to the change of altitude, said cam being so laid out that the lift of the pin thereon is a function of the square of the time of fall of the bomb, a second three dimensional cam positioned axially from the lift of said first mentioned pin, and means for positioning said cam rotationally in accordance with the horizontal retardation rate of the bomb, said cam being so laid out that the lift of the pin thereon is proportional to trail.

6. In a bomb sight for aircraft, the combination with an optical system rotatable in azimuth and a pilot director, manually operated means for rotating said system to maintain the sight on the target and for simultaneous operation of said pilot director to cause turning of the craft until the straight ground track is reached, motor driven means differentially connected to said manually driven means, a directional gyroscope to control said motor driven means for normally stabilizing said optical system in azimuth, and switch means for automatically transferring the control of said pilot director from said manual to said motor means upon the straight ground track being reached.

7. An offset mechanism for bomb sights having

...le along and adjacent... with a graduated auxiliary scale in the line ...with the cross hairs, a movable pointer readable a reticle ...of sight of said...ans for automatically moving ...accordance with the offset.
thereon...set mechanism as claimed in claim 7, said...h said pointer moving means includes a ...positioned in accordance with the trail, a part positioned in accordance with the sine of the drift angle, and means for combining the movement of said parts.

9. In a bomb sight, variable speed means for turning the line of sight to keep it on the target, including a cam and cam shaft, a pin thereon the lift of which turns said line of sight, said cam being so laid out that the rate of rotation of its shaft is directly proportional to ground speed, and a bomb releasing contact actuated by the rotation of said shaft.

10. In a glide bomb sight, means for determining the rate of change of altitude, a variable speed device for maintaining the line of sight on the target, comprising a revoluble disc, a roller driven thereby, means for radially adjusting the roller on the disc according to ground speed, means for rotating the line of sight from said roller, and a second variable speed device for rotating said disc, also comprising a revoluble disc, a roller driven thereby, and means controlled by said rate for continuously adjusting said last named roller on said last named disc in accordance with the ratio of a fixed altitude to the momentary altitude.

11. In a bomb sight, a variable speed device for maintaining the line of sight on the target, including a driving part and a part driven therefrom at a relative speed proportional to its position thereon, a second variable speed device for driving said first named driving part, including a driving part and a part driven therefrom at a relative speed proportional to its position thereon, said driven part actuating the driving part of said first device, and a third variable speed device for positioning said driven part, including a constantly rotated driving part, a part driven therefrom at a speed proportional to its position thereon, means actuated therefrom for positioning the driven part of said second mentioned device, and means for positioning the driven part of said last named device in accordance with the rate of change of altitude.

12. A bomb sight as claimed in claim 11, having direct means for initially positioning the driven part of the second mentioned device in accordance with the initial altitude.

13. In a bomb sight for aircraft, an observing eye piece, an artificial horizon such as a gyro-vertical, a reticle stabilized therefrom about a normally fore and aft and an athwartship axis, and an object following pivoted reflector for reflecting an image of the target on said reticle and thence into said eye piece, said reflector being stabilized by said artificial horizon about at least said fore and aft axis.

14. In a bomb sight for aircraft, an observing eye piece, a gyro-vertical, a gimbal mounting therefor having its major axis normally fore and aft, a reticle visible in said eye piece and mounted on said gyroscope, and an object following reflector for reflecting an image of the target on said reticle pivoted on the gimbal and thence into said eye piece, whereby said reflector is stabilized about said fore and aft axis.

15. A bomb sight as claimed in claim 13, also having direction maintaining means such as a directional gyroscope, and means for stabilizing in azimuth therefrom said artificial horizon and its connected reticle and reflector.

16. In a bomb sight, a gyro-vertical for stabilizing the line of sight against rolling and pitching and having an erection device, a directional gyroscope for stabilizing the line of sight in azimuth, means for normally caging said directional gyroscope and for releasing it at the beginning of target approach, switch means engaged by said means to actuate a pilot directing device for causing the craft to fly in a curved path until the straight ground track is reached, said last named means rendering said erection device substantially inoperative until the straight ground track is reached.

17. In a bomb sight, a gyro-vertical for stabilizing the line of sight against rolling and pitching and having an erection device, a directional gyroscope for stabilizing the line of sight in azimuth, means for normally caging said azimuth gyroscope and for releasing it at the beginning of target approach, and means responsive to caging and uncaging of said azimuth gyroscope for decreasing the effectiveness of said erection device during target approach below the effectiveness prior to uncaging.

18. In a bomb sight, a gyro-vertical for stabilizing the line of sight against rolling and pitching and having an erection device, a directional gyroscope for stabilizing the line of sight in azimuth, means for normally caging said azimuth gyroscope and for releasing it upon approaching a target, means responsive to caging and uncaging of said azimuth gyroscope for changing the effectiveness of said erection device while said gyroscope is uncaged, and means responsive to turning of the craft after said directional gyroscope is uncaged for rendering said erection device inoperative.

19. In a gyro-vertical for bomb sights and the like, a neutrally mounted gyroscope, a gravitationally responsive device mounted thereon, an electromagnetic means acting between said device and gyroscope producing a rotating field which on relative tilt of said gyroscope produces an erecting torque thereon, and means for temporarily increasing the strength of said electromagnetic means prior to a target approach and thereafter employing a much weaker means during the target approach.

20. In a gyro-vertical, a neutrally mounted gyroscope, a gravitationally responsive device mounted thereon, an electromagnetic means acting between said device and gyroscope producing a rotating field which on relative tilt of said gyroscope produces an erecting torque thereon, and means for temporarily varying the relative strength of said electromagnetic means at will to increase, reduce and/or eliminate the erective force.

21. In a bomb sight computing mechanism for computing the trail, a three dimensional cam and cam pin which are relatively positioned axially and rotationally of the cam in accordance with the component vertical velocity of glide or rate of change of altitude and the instantaneous altitude, respectively, including means for originally positioning said cam in one direction in accordance with the initial altitude, means for continuously moving said cam in said direction at a rate proportional to the rate of change of altitude, and means for moving said cam in the other direction through a distance proportional to said change of altitude, said cam being so laid out that the lift of the pin thereon is a function of the square of the time of fall of the bomb.

22. A bomb sight computing mechanism as claimed in claim 3, having a second three-dimensional cam giving a pin lift proportional to the whole range angle and having a third three-dimensional cam and cam pin movable with said first cam in both directions, said third cam being so laid out that the lift of the pin thereon is a function of the square of the time of fall of the bomb, a fourth cam positioned axially from the lift of said third pin, means for positioning the same rotationally in accordance with the horizontal retardation of the bomb, said cam being so laid out that the lift of the pin is proportional to trail, and means for subtracting the lift movements of said second and fourth cam pins, whereby trail is subtracted from whole range to give true range angle.

23. Means for determining the true point of release in bomb sights, including two pairs of three-dimensional cams, cam lift pins on each of said cams, the second cam of each pair being moved in one direction by the lift of the pin on the first cam of each pair, respectively, the lift of the pin on one of said second cams being whole range and the lift of the pin on the other of said second cams being trail, and means for subtracting the movements of said pins.

24. In a bomb sight, apparatus for determining trail, comprising a three dimensional cam, a cam follower, said cam and follower being relatively positioned in accordance with altitude and vertical velocity for moving said follower according to the square of the time of fall, a second three dimensional cam positioned by a member and said follower in accordance with the retardation factor and the square of the time of fall, and a cam pin positioned by said last-named cam, whereby said cam pin is displaced proportionately to trail.

25. In a bomb sight for aircraft, a stationary eye piece, a gyro vertical, a reticle stabilized by said gyro vertical about two independent axes, a directional gyro, a sighting member supported for stabilization by said gyro vertical about one of said axes, and means controlled by said directional gyro for stabilizing said sighting deflector about a third axis, said sighting deflector being arranged to direct an image of the target to said reticle, and thence to said eye piece thereby providing a stabilized line of sight.

26. In a bomb sight, a mechanism for computing whole range comprising means settable according to instantaneous vertical velocity of the bomb sight, means settable according to ground speed, means settable according to instantaneous altitude, mechanism adjusted by said first and third-mentioned means for determining time of fall, and a multiplier actuated by said mechanism and said second-mentioned means for determining the whole range.

27. In a bom... the ground spee... to a target, compr... having two input memb... ber, said output member be... proportional to the product o... placement of the first of said input... the displacement of the second of said... members, means for driving said first input me... ber at a rate proportional to the ratio of a fixed altitude to the instantaneous altitude of said bomb sight, optical means defining a line of sight to said target, means for actuating a member of said optical means from said output member proportionately to a predetermined function of the displacement of said output member to produce a corresponding rotation of the line of sight about an axis substantially normal to the line of flight of said bomb sight, means for manually adjusting the displacement of said second input member so as to maintain the line of sight on the target, whereby the displacement of said output member is proportional to the instantaneous range to said target, and the displacement of said second input member is proportional to ground speed, a plurality of cooperating control members, means for displacing a first of said control members proportionately to a first predetermined function of instantaneous altitude and vertical velocity, means actuated by said first-named displacing means and said second input member for displacing a second of said control members proportionately to predetermined functions of altitude, vertical velocity and ground speed, means for displacing a third of said control members proportionately to a second predetermined function of instantaneous altitude and vertical velocity, means for displacing a fourth of said control members by said third-named displacing means and a third input member proportionately to predetermined functions of altitude, vertical velocity and the retardation factor of the bomb, a fifth control member displaced by and proportionately to the difference between the displacement of said second control member and the displacement of said fourth control member, and a bomb release actuator operable when the displacements of said fifth control member and said output member become equal.

28. In a bomb sight for aircraft, a stationary eye piece, a gyro, a reticle stabilized by said gyro about two mutually perpendicular axes, and a sighting deflector stabilized by said gyro about only one of said axes and arranged to direct an image of the target to said reticle, said sighting deflector being mounted for rotation about an axis perpendicular to said one axis independently of said gyro to follow said target.

EARL W. CHAFEE.
HOWARD C. VAN AUKEN.